US007945950B2

(12) United States Patent (10) Patent No.: US 7,945,950 B2
Nanda et al. (45) Date of Patent: May 17, 2011

(54) GENERIC INTERACTIVE CHALLENGES IN A DISTRIBUTED SYSTEM

(75) Inventors: Arun K. Nanda, Sammamish, WA (US); Christopher G. Kaler, Sammamish, WA (US); Tariq Sharif, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 861 days.

(21) Appl. No.: 11/925,734

(22) Filed: Oct. 26, 2007

(65) Prior Publication Data

US 2009/0113534 A1 Apr. 30, 2009

(51) Int. Cl.
*G06F 7/04* (2006.01)

(52) U.S. Cl. .................................................. 726/10
(58) Field of Classification Search .................. 726/10
See application file for complete search history.

(56) References Cited

U.S. PATENT DOCUMENTS

| | | | |
|---|---|---|---|
| 6,772,336 B1* | 8/2004 | Dixon, Jr. .................... 713/165 |
| 7,191,467 B1* | 3/2007 | Dujari et al. ...................... 726/5 |
| 7,200,576 B2 | 4/2007 | Steeves et al. |
| 2003/0055962 A1 | 3/2003 | Freund et al. |
| 2005/0065802 A1 | 3/2005 | Rui et al. |
| 2005/0091338 A1 | 4/2005 | de la Huerga |
| 2005/0166263 A1 | 7/2005 | Nanopoulos et al. |
| 2005/0239447 A1 | 10/2005 | Holzman et al. |
| 2006/0041759 A1 | 2/2006 | Kaliski, Jr. et al. |
| 2006/0095578 A1 | 5/2006 | Paya et al. |
| 2007/0101010 A1 | 5/2007 | Ellison et al. |
| 2007/0234423 A1 | 10/2007 | Goodman et al. |
| 2007/0239730 A1 | 10/2007 | Vigelette et al. |
| 2008/0066165 A1* | 3/2008 | Rosenoer ........................ 726/5 |
| 2009/0037983 A1* | 2/2009 | Chiruvolu et al. ................. 726/4 |

OTHER PUBLICATIONS

BaffleText: a Human Interactive Proof (11 pages) http://www.cse.lehigh.edu/_baird/Pubs/baffletext.pdf.
Challenge and Response with 1-Wire SHA devices (5 pages) http://pdfserv.maxim-ic.com/en/an/app190.pdf.
Challenge-Response Access Control (3 pages) http://research.microsoft.com/~cormac/.
Multi-Layer Authentication FAQ's (3 pages) https://mfa.afcuonline.org/auth/faq.htm.
U.S. Appl. No. 10/340,225, "Performing Generic Challenges in a Distributed System", filed Jan. 10, 2003. (51 pages).
SOAP Extensions: Basic and Digest Authentication, Network Working Group Internet-Draft, Oct. 31, 2001, Cunnings and Salz (21 pages).
Della- Libera et al. Web Service Trust Language (WS-Trust), Dec. 18, 2002 (30 pages).
Office Action mailed May 22, 2006 in related case U.S. Appl. No. 10/340,225 (16 pages).
Office Action mailed Jun. 19, 2007 in related case U.S. Appl. No. 10/340,225 (23 pages).
Office Action mailed Dec. 13, 2007 in related case U.S. Appl. No. 10/340,225 (10 pages).
U.S. Appl. No. 10/340,225, filed Apr. 18, 2008, Notice of Allowance.

* cited by examiner

*Primary Examiner* — Kambiz Zand
*Assistant Examiner* — Teshome Hailu
(74) *Attorney, Agent, or Firm* — Workman Nydegger (57) ABSTRACT

A challenge mechanism in which a challenge is issued from one message processor to another. In generating the challenge, the message processor may select any one or more of a number of available interactive challenge types, where each type of challenge type might use different user-originated information. Upon receiving the challenge, the challengee message processor may identify the challenge type based on information provided in the challenge, and perform different actions depending on the challenge type. The challengee message processor then generates an appropriate challenge response, and issues that challenge response to the challenger message processor. The challenger message processor may then validate the challenge response.

20 Claims, 3 Drawing Sheets

GENERIC INTERACTIVE CHALLENGES IN A DISTRIBUTED SYSTEM

BACKGROUND

Often, electronic communication on a computer network involves one computing system (hereinafter called a "challenger") issuing an interactive challenge to another computing system (hereinafter called a "challengee") over a computer network. The challengee may then acquire some information originating from a user, and then use that information to generate a challenge response. Such an interactive challenge is often done for purposes of authentication, but may be done for other purposes as well.

As an example, the challengee may issue a security token request that includes a username and password to the challenger. However, before issuing the security token, the challenger may require an accurate response to a challenge. For instance, the challenger might ask the challengee to provide a Personal Identification Number (PIN) for its user, might require a user to enter an additional one-time use password, and/or might require a user to enter text as it appears in an image provided by the challenger. Upon responding successfully to the challenge, the challenger may then provide the requested security token to the challengee.

Existing challenge mechanisms often utilize specialized protocols to issue challenges and receive responses to challenges. Some of these specialized protocols prescribe both the types of challenges that are used and the protocols used to implement the challenges. Others of these specialized protocols allow the protocols used to implement challenges to be varied. However, while the algorithms used to implement challenges can be varied, the types of challenges typically cannot. This makes it difficult to extend the typical challenge protocols to support additional types of interactive challenges and support additional algorithms for implementing challenges.

For example, the security token services (STS) framework defined by WS-Trust allows for a simple request and response for security tokens as well as an extension mechanism to enable exchanges for negotiation and challenges. The WS-Trust specification defines a "signature challenge" construct as a specific type of exchange that makes use of the above extension mechanism for general exchanges.

BRIEF SUMMARY

For a variety of possible reasons, one message processor may issue a challenge to another message processor. In response to a request from a message processor (a "requesting" message processor), another message processor (a "challenger" message processor) may issue a challenge to a message processor (a "challengee" message processor). The requesting and challengee message processors may, but need not, be the same message processor.

The challenger message processor may select any one or more of a plurality of available interactive challenge types, where each type of challenge type might use different user-originated information. The challenge message processor then sends the appropriate challenge to the challengee message processor. The challenge may identify the appropriate challenge type of that challenge. The challenge type may differ depending on one or more of a variety of potential factors.

Upon receiving the challenge, the challengee message processor may identify the challenge type based on information provided in the challenge, and perform different actions depending on the challenge type. In some cases, the challengee message processor may interface with a user to acquire any information used to respond to the challenge. In other cases, the challengee message processor may acquire cached user-information obtained previously from the user. The challengee message processor then generates an appropriate challenge response, and issues that challenge response to the challenger message processor. The challenger message processor may then validate the challenge response.

Additional features and advantages of various embodiments will be set forth in the description that follows, and in part will be obvious from the description, or may be learned by the practice of the invention. The features and advantages may be realized and obtained by means of the instruments and combinations particularly pointed out in the appended claims. These and other features will become more fully apparent from the following description and appended claims.

BRIEF DESCRIPTION OF THE DRAWINGS

In order to describe the manner in which the above-recited and other advantages and features can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In accordance with embodiments of a challenge mechanism described herein, a challenging message processor may select from a number of different challenge types when challenging another message processor that requests service. The challenge types may be selected and used without affecting the underlying framework of the challenge message. First, a computing system that may serve as one or more message processors will be described with reference to FIG. 1. Then, various non-limiting embodiments of a challenge mechanism will be described with respect to FIGS. 2 and 3.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As the term is used herein, a "message processor" is any component (whether software, hardware, or a combination of software and hardware) that is capable of processing a message. The computing system described with respect to FIG. 1 may be a message processor. However, a message processor may also be a software application or component of such a computing system, or may be implemented entirely in hardware in some cases. A message processor may be logically considered to be on a single machine, or may be distributed over several computing systems, as might be the case if the message processor were a server farm. The term "message processor" is thus intended to be construed very broadly.

Figure 1:
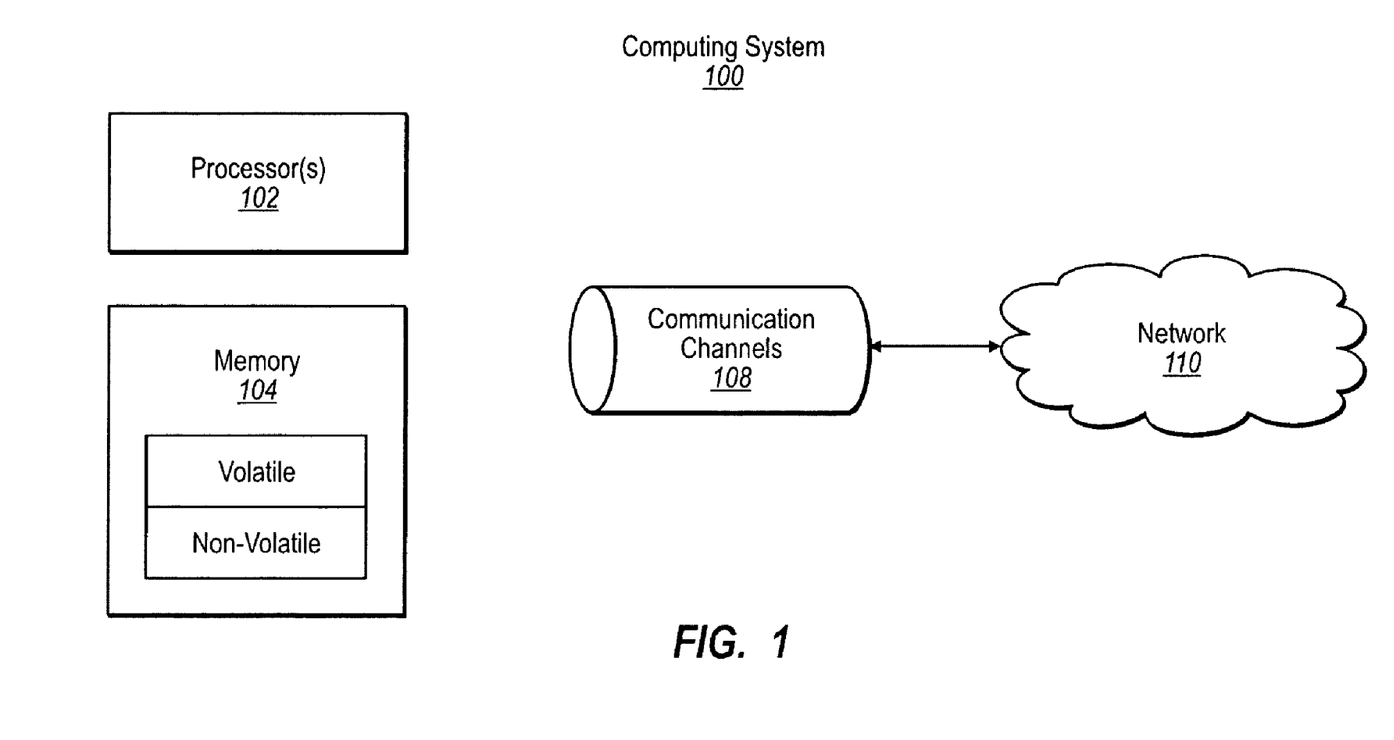
FIG. 1 illustrates a suitable operating environment for the principles of the present invention.

Referring to FIG. 1, in its most basic configuration, a computing system 100 typically includes at least one processing unit 102 and memory 104. The memory 104 may be a physical system memory, which may be volatile, non-volatile, or some combination of the two. The term "memory" may also be used herein to refer to non-volatile mass storage such as physical storage media. As used herein, the term "module" or "component" can refer to software objects or routines that execute on the computing system. The different components, modules, engines, and services described herein may be implemented as objects or processes that execute on the computing system (e.g., as separate threads).

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
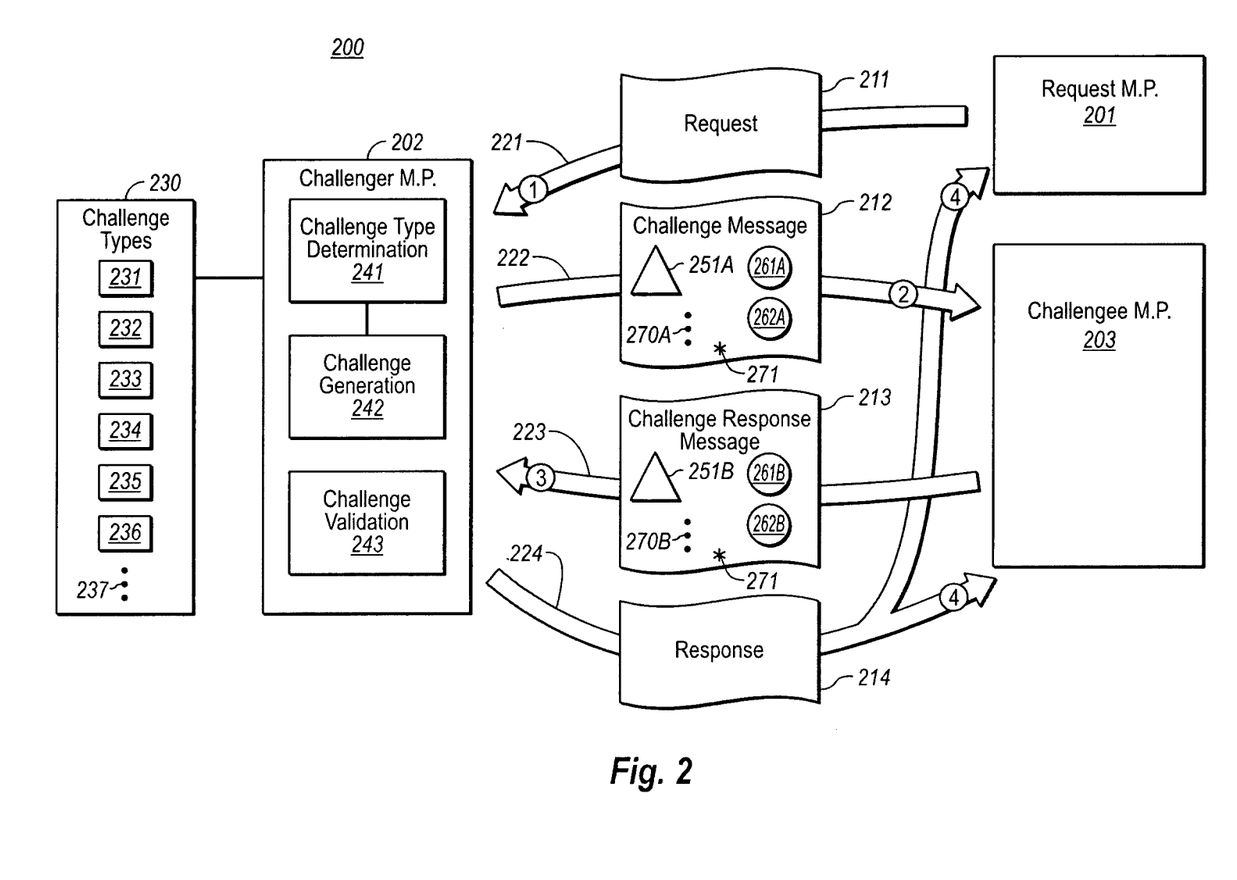
FIG. 2 illustrates an environment in which a challenge exchange may occur.

FIG. 2 illustrates an environment 200 in which embodiments described herein may be practiced. The environment 200 includes requesting message processor 201, challenger message processor 202, and challengee message processor 203. The term "M.P." in the drawings is used as an abbreviation for "message processor". Each of the message processors 201 through 203 may be any software and/or hardware component that is capable of processing a message. The challenger message processor 202 is communicatively coupled with the requesting message processor 201 and the challengee message processor 203 so as to be able to communicate messages between the message processors. If located over a network, then the message processors may be connected or be otherwise able to communicate over the network. However, some or even all of the message processors may perhaps even be located on the same physical machine. In contrast, a single message processor may even be distributed across multiple physical machines.

Often message processors are capable of performing many functions. The modifiers "requesting", "challenger", and "challengee" when attributed to a message processor in this example is not intended to imply that the processing functionality of the message processor is restricted to the functionality described by such a modifier. However, these modifiers are helpful in describing the example message exchange that occurs in the particular example of FIG. 2.

In the example of FIG. 2, the requesting message processor 201 sends a request 211 to the challenger message processor 202 as symbolically represented by the arrow 221. In one example, perhaps the request 221 is a request for a security token, or a request for some other service for which a challenge exchange might be beneficial. Of course, as with the other message processors 202 and 203, the requesting message processor 201 is not limited to a requesting functionality and may be quite general purpose.

The challenger message processor 202 then issues a challenge message 212 to a challengee message processor 203 as represented by the arrow 222. Challenges may be issued for a variety of purposes. For instance, challenge and challenge response exchanges are often performed for purposes of authentication, although they may also be used for authorization or other purposes. In one embodiment, the requesting message processor 201 and the challengee message processor 203 are the same message processor, although they are illustrated separately to emphasize that that need not be the case by any means. Although not required, the challenge message processor 212 may include context data 271 that may be echoed back with the challenge response. The context data includes state information that will allow the challenger message processor to reproduce the context of the challenge/response exchange when a subsequent challenge response is received. This relieves the challenger message processor 202 from having to remember that context while it waits for a response. This may be particularly useful when scaling up the challenger message processor. For instance, if there are many challenge/response exchanges with many other message processors, this may alleviate memory and storage requirements in the aggregate. Furthermore, this will also allow the challenger message processor to be implemented as a server farm, without having to propagate all contexts for all challenge/response exchanges to all servers in the farm.

In issuing the challenge, the challenger message processor 202 may select from any of a variety of challenge types without affecting the underlying messaging framework. For instance, the challenger message processor 202 has access to a plurality of challenge types 230 illustrated as including a number of different challenge types 231 through 236, amongst other numbers of challenge types as represented by the vertical ellipses 237. A challenge type determination module 241 (which may be software, hardware, or a combination) may determine which types of challenges are to be included in the challenge message 212. There may be one, two, or even more different challenge types in a single message, and the type of challenge types may vary without affecting the underlying messaging framework used to send the challenge message 212. A challenge generation module 242 may generate one or more challenge instances for each identified challenge type, and may include that challenge instance in the challenge message 212. For example, the challenge message 212 is illustrated as including one challenge 251A of a first challenge type (represented as a triangle), and two challenges 261A and 262A of a second challenge type (represented as circles to emphasize that these challenge is of a different type than the first challenge type represented by a triangle). The flexibility of the selection and number of different challenge types, and the number of challenges of a particular challenge type is represented by the ellipses 270A.

The variety of challenge types from which the challenge type determination module 241 may select may be quite varied in contrast with many conventional challenge mechanisms that are basically limited to a particular challenge type. For instance, the challenge type may be a multiple choice challenge type that requires a user to select from one of multiple options (e.g., which of the following is not a previous address of yours), a text input that requires user input (e.g., please enter your mother's maiden name, please enter your pin, please enter the text that appears in the caption image, etc.), a one time or temporary password that only the user would know, or the like. The challenge message may include the caption image itself.

The challengee message processor 203 then interfaces with a user to acquire the user information needed to generate an appropriate challenge response message 213. For instance, the challengee message processor 203 may identify the challenge type, and generate an appropriate user interface to allow the user to enter the information. For example, a different user interface might appear if the user had to select multiple-choice answers, as compared to entering a text answer such as mother's maiden name. Alternatively or in addition, the challengee message processor 203 may perform other action necessary to respond to the challenge such as, for example, acquire previously cached user-answers. For instance, the user might have previously provided the mother's maiden name to the challengee message processor, thereby allowing the challenge response to perhaps be generated without interfacing in real time with the user, although at some point interfacing with the user was performed to acquire the information.

The challengee message processor 203 generates the challenge response message 213, which includes a challenge response 251B, 261B, 262B for each of the corresponding challenges 251B, 261B, 262B. Other challenge responses may also be included as represented by the vertical ellipses 270B in order to response to other challenges 270A if appropriate. The challenge response is then sent to the challenger message processor 202.

A challenge validation module 243 of the challenger message processor 202 then validates the challenge response to each of the challenges, and then determines what appropriate action to take when sending a response 214 back to the challengee or requesting message processors 201 and/or 203 as represented by the two-headed arrow 224. For instance, if validation was unsuccessful, the response might indicate that the request is denied, honored but with a lower level of access, or perhaps indicate further conditions to be completed prior to honoring the request. For instance, perhaps a backup challenge/response is issued in a similar manner as described for the first challenge/response exchange. On the other hand, if the first challenge response is validated, then the response might include appropriate action for that as result as well. For instance, the response 214 might include the item originally requested. Alternatively, or in addition, the response 214 may be a second challenge message, with a similar framework structure as described for challenge message 212, but perhaps with different challenges. This process may repeat, iteratively for one or more additional challenge/response exchanges, until the request is ultimately denied or granted.

Each of the four messages 211 through 214 may be a hierarchically structured message (at least at the application level), such as a Simple Object Access Protocol (SOAP) envelope structured using eXtensible Markup Language (XML), although that need not be the case. An example is a SOAP message in which header information is often provided in accordance with WS-Security, and much of the body is structured in accordance with WS-Trust. An embodiment may be implemented using an additional XML protocol defined on top of WS-Trust as will be explained with respect to the specific examples.

Figure 3:
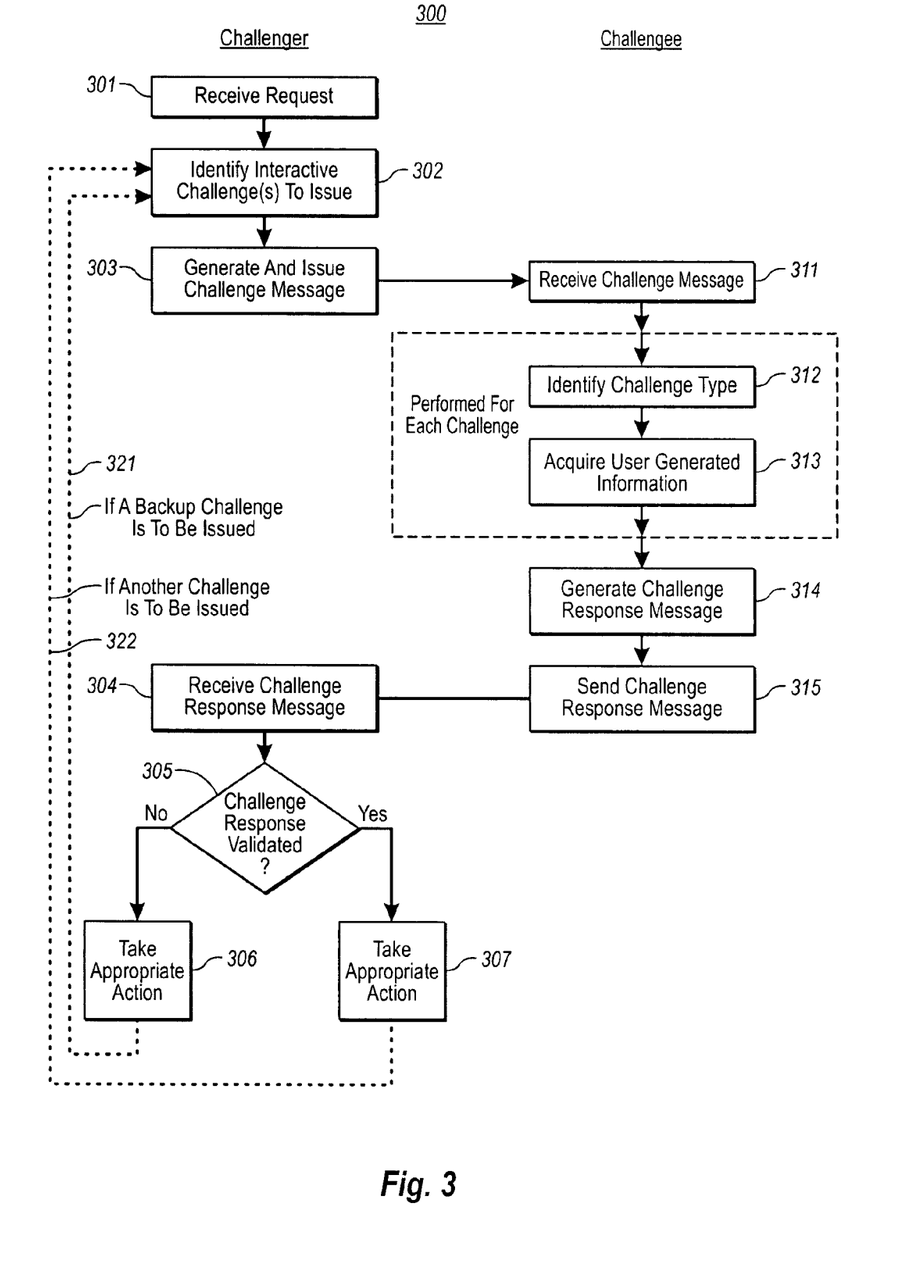
FIG. 3 illustrates a flowchart of a method for conducting a challenge exchange in accordance with one particular embodiment.

FIG. 3 illustrates a flowchart of a method 300 for the challenger message processor to challenge a challengee message processor. Some of the acts of the method 300 are performed by the challenger message processor, which are represented in the left column of FIG. 3 under the header "Challenger". Other acts of the method 300 are performed by the challengee message processor, which are represented in the right column of FIG. 3 under the header "Challengee". The method 300 will be described with respect to the general environment 200 of FIG. 2, and will also be described with respect to a specific SOAP messaging example, although the principles of the present invention will be understood to be not limited to such a specific example.

The illustrated portions of the method 300 are initiated when the challenger message processor receives an electronic request from another message processor (act 301). For instance, the challenger message processor 202 of FIG. 2 receives the request 211 from the requesting message processor 201. The following is an example of a SOAP message that may represent that request with line numbering added for purposes of subsequent reference only:

```
1.   <S11:Envelope ...>
2.     <S11:Header>
3.       ...
4.       <wsse:Security>
5.         <wsse:UsernameToken>
6.           <wsse:Username>Zoe</wsse:Username>
7.           <wsse:Password>
                Type="http://...#PasswordText">ILoveDogs</wsse:Password>
8.         </wsse:UsernameToken>
9.       </wsse:Security>
10.    </S11:Header>
11.    <S11:Body>
12.      <wst:RequestSecurityToken>
13.        <wst:TokenType>http://example.org/customToken</wst:TokenType>
14.        <wst:RequestType>...</wst:RequestType>
15.      </wst:RequestSecurityToken>
16.    </S11:Body>
17.  </S11:Envelope>
```

Lines 1-17 represent a SOAP message request for a security token. Lines 1-10 represent the header element, which includes a security element in lines 4-9 which is defined by WS-Security. The security element includes a UserNameToken element (at lines 5-8), that includes a UserName element (at line 6 defining a user name of "Zoe") and a Password element (at line 7 defining a password of "Ilovedogs"), each of these elements defined by WS-Security. The body (at lines 11-16) includes a RequestSecurityToken element (at lines 12-15) which makes the message as a whole be a request for a security token as defined by WS-Trust. Line 13 defines the token type described using a URI as a unique identifier. Line 14 defines the request type. The request may, but need not, be a request for a security token. In this example, however, the request is for a security token.

In response to the request, the challenger message processor identifies a type of interactive challenge to issue from amongst a number of different types of interactive challenges (act 302). Referring to FIG. 2, for example, the challenger message processor 202 may select from amongst a plurality of interactive challenge types 230 using the challenge type determination module 241. In the specific example, the challenger message processor selects text based secret question type challenge, and an age group choice challenge type as will become apparent from the further description of the example.

The challenger message processor 202 then generates a challenge message using the challenge generation module 242, and issues the interactive identified challenge to the challengee message processor within a challenge message (act 303). The challenge message may optionally include a state token (symbolically represented by the asterisks 271 in FIG. 2). The state token may include some of all of the information needed for a message processor to subsequently reconstruct the state needed to receive and validate a response corresponding to the challenge. This partially or fully relieves the challenger message processor from remembering that state, and potentially allows other message processors to appropriately validate a response to a challenge. Thus, the challenger message processor may be implemented even as a distributed server farm.

Continuing the first SOAP example mentioned above, the challenge message may appear as follows with line number added for clarity:

```
1.   <S11:Envelope ...>
2.     <S11:Header>
3.     ...
4.     </S11:Header>
5.     <S11:Body>
6.       <wst:RequestSecurityTokenResponse>
7.         <xx:InteractiveChallenge>
8.           <xx:Title> ...
9.           </xx:Title>
10.          <xx:TextChallenge RefId="http://.../ref#text1" MaxLen=80
11.             Label="Mother's Maiden Name">
12.          </xx:TextChallenge>
13.          <xx:ChoiceChallenge RefId="http://.../ref#choiceGroupA"
                Label="Your Age Group:" ExactlyOne="true">
14.            <xx:Choice RefId="http://.../ref#choice1"
15.               Label="18-30">
16.            </xx:Choice>
17.            <xx:Choice RefId="http://.../ref#choice2">
18.               Label="31-40">
19.            </xx:Choice>
20.            <xx:Choice RefId="http://.../ref#choice3">
21.               Label="41-50">
22.            </xx:Choice>
23.            <xx:Choice RefId="http://.../ref#choice4">
24.               Label="50+">
25.            </xx:Choice>
26.          </xx:ChoiceChallenge>
27.          <xx:ContextData RefId="http://.../ref#cookie1">
                ... </xx:ContextData>
28.        </xx:InteractiveChallenge>
29.      </wst:RequestSecurityTokenResponse>
30.    </S11:Body>
31.  </S11:Envelope>
```

Lines 1-31 represent the SOAP-structured challenge message. Lines 2-4 represent the SOAP header, whereas lines 5-30 represent the body of the SOAP envelope. Lines 6-29 identify a RequestSecurityTokenResponse element, which is a framework element defined by WS-Trust. Lines 7-28 identify an InteractiveChallenge element, which is not defined by WS-Trust, and which may have a schema described further below. In this example, the elements that include the marker "xx" are custom, and not defined by WS-Trust or WS-Security. In this particular instance of the InteractiveChallenge element, the element has a "Title" child element that may define a title for the InteractiveChallenge element. The InteractiveChallenge element may be a parent node in the hierarchically structured message, that may have descendent nodes that represent challenges of varying types.

For example, lines 10-12 represent a TextChallenge element, which may prompt the user to enter his/her mother's maiden name. Lines 13-26 represent a ChoiceChallenge element, that may prompt the user to select from multiple options, in this case, age ranges. For instance, lines 14-16 represent an age choice element for age range 18-30, lines 17-19 represent an age choice element for age range 31-40, lines 20-22 represent an age choice for age range 41-50, and lines 23-25 represent an age choice element for age range 50+. The context data element at line 27 may include the context data that is to be echoed back with the challenge response. The context data may include state information necessary or useful to determine whether the challengee message processor correctly answers the challenge.

The InteractiveChallenge element permits a varying number or challenges of a variety of different challenge types. The following describes a schema for such an InteractiveChallenge element:

```
<InteractiveChallenge ...>
  <Title> xs:string </Title> ?
  <TextChallenge RefId="xs:anyURI" MaxLen="xs:int"?
    HideText="xs:boolean"?
    Label="xs:string"? >
    <Image MimeType="xs:string"> xs:base64Binary </Image> ?
  </TextChallenge> *
  <ChoiceChallenge RefId="xs:anyURI" Label="xs:string"?
    ExactlyOne="xs:boolean"?>
    <Choice RefId="xs:anyURI" Label="xs:string"? >
      <Image MimeType="xs:string"> xs:base64Binary </Image> ?
    </Choice> +
  </ChoiceChallenge> *
  <ContextData RefId="xs:anyURI"> xs:any </ContextData> *
</InteractiveChallenge>
```

The following describes the attributes and elements listed in the schema outlined above although the principles of the present invention are not limited to such a schema, nor limited to the use of an interactive challenge with a hierarchically structured document. When an element is described as "required", that means that the element is used in this particular schema, and does not imply that the element is required of the invention. Similarly, an attribute is described as "required" if the attribute is to be present in the parent element if the parent element is present, and is not used to imply that the attribute is required of the invention. If fact, the principles of the present invention are not limited to hierarchically structured messages at all. Each of the elements, attributes, and extension mechanisms of the schema will now be described as follows:

/InteractiveChallenge element: A container element for a challenge that requires interactive user input (or cached user input).

/InteractiveChallenge/Title element: An optional element that specifies an overall title text to be displayed to the user (e.g. a title describing the purpose or nature of the challenge).

/InteractiveChallenge/TextChallenge element: An optional element that specifies a challenge that requires textual input from the user.

/InteractiveChallenge/TextChallenge/@RefId attribute: A required attribute that specifies a reference identifier for this challenge element which is used to correlate the corresponding element in the response to the challenge.

/InteractiveChallenge/TextChallenge/@MaxLen attribute: An optional attribute that specifies the maximum length of the text string that is sent as the response to this text challenge. This value may serve as a hint for the user interface software at the challengee message processor which manifests the end-user experience for this challenge.

/InteractiveChallenge/TextChallenge/@HideText attribute: An optional attribute that specifies that the response to this text challenge must (if conforming to the schema) receive treatment as hidden text in any user interface. For example, the text entry may be displayed as a series of asterisks in the user interface. This attribute serves as a hint for the user interface software at the challengee message processor that manifests the end-user experience for this challenge.

/InteractiveChallenge/TextChallenge/@Label attribute: An optional attribute that specifies a label for the text challenge item (e.g. a label for a text entry field) which will be shown to the user.

/InteractiveChallenge/TextChallenge/Image element: An optional element that contains a base64 encoded inline image specific to the text challenge item to be shown to the user (e.g. an image that the user must see to respond successfully to the challenge). For instance, if a caption image is to be included in the challenge message, this element would be present, and populated with the encoded inline image.

/InteractiveChallenge/TextChallenge/Image/@MimeType attribute: a required attribute if the parent element is present. The attribute specifies a MIME type (e.g., image/gif, image/jpg) indicating the format of the image.

/InteractiveChallenge/ChoiceChallenge element: An optional element that specifies a challenge that requires a choice among multiple items by the user.

/InteractiveChallenge/ChoiceChallenge/@RefId attribute: A required attribute (if the parent element is present) that specifies a reference identifier for this challenge element which is used to correlate the corresponding element in the response to the challenge.

/InteractiveChallenge/ChoiceChallenge/@Label attribute: An optional attribute that specifies a title label for the choice challenge item (e.g., a text header describing the list of choices as a whole) which will be shown to the user.

/InteractiveChallenge/ChoiceChallenge/@ExactlyOne attribute: An optional attribute that specifies if exactly once choice must be selected by the user from among the child element choices. The absence of this attribute implies the value "false" which means multiple choices can be selected.

/InteractiveChallenge/ChoiceChallenge/Choice element: a required element that specifies a single choice item within the choice challenge.

/InteractiveChallenge/ChoiceChallenge/Choice/@RefId attribute: a required attribute that specifies a reference identifier for this specific choice item which is used to correlate the corresponding element in the response to the challenge.

/InteractiveChallenge/ChoiceChallenge/Choice/@Label attribute: An optional attribute that specifies a text label for the choice item (e.g., text describing the individual choice) which will be shown to the user.

/InteractiveChallenge/ChoiceChallenge/Choice/Image element: An optional element that contains a base64 encoded inline image specific to the choice item to be shown to the user (e.g. an image that the user must see to respond successfully to the challenge).

/InteractiveChallenge/ChoiceChallenge/Choice/Image/@MimeType attribute: A required attribute that specifies a MIME type (e.g., image/gif, image/jpg) indicating the format of the image.

/InteractiveChallenge/ContextData element: An optional element that specifies a value that is required to be reflected back in the response to the challenge (e.g., cookie). The element may contain any value. The actual content is opaque to the requester; it is not required to understand its structure or semantics. This can be used by a challenger message processor, for instance, to store information between the challenge/response exchanges that would otherwise be lost if the challenger message processor were to remain stateless.

/InteractiveChallenge/ContextData/@RefId attribute: A required attribute that specifies a reference identifier for this context element which is used to correlate the corresponding element in the response to the challenge.

/InteractiveChallenge/{any} element extensibility mechanism: This is an extensibility mechanism to allow additional elements to be specified.

/InteractiveChallenge/@{any} attribute extensibility mechanism: This is an extensibility mechanism to allow additional attributes to be specified.

Referring back to FIG. 3, upon receiving the challenge message (act 311), the challengee message processor may identify the challenge type (act 312) for each of the challenges in the challenge message. For instance, the challenge type may be identified in the schema described above by identifying the name of the interactive challenge element. Based on the challenge type, the challengee message processor may then acquire a type of user-issued information that matches the type of information called for by the challenge type (act 313). For instance, for the mother's maiden name, the challengee message processor may query the user for the mother's maiden name, or may query its cache for that information. For the age group choice selection, the challengee message processor may present the options to the user, or query cache. Different user interfaces may be presented for different interactive challenge types.

The challengee message processor then generates a challenge response message that includes a challenge response that is generated using the user-issued information (act 314). The challenge response message is then submitted to the challengee message processor (act 315). For instance, in FIG. 2, the challengee message processor 203 submits the challenge response message 213 to the challenger message processor 202. In the case of the first SOAP example mentioned above, the challenge response message may appear as follows with line numbering added for subsequent reference:

```
1.   <S11:Envelope ...>
2.     <S11:Header>
3.        ...
4.     </S11:Header>
5.     <S11:Body>
6.       <wst:RequestSecurityTokenResponse>
7.         <xx:InteractiveChallengeResponse>
8.           <xx:TextChallengeResponse RefId="http://.../ref#text1">
9.              Goldstein
10.          </xx:TextChallengeResponse>
11.          <xx:ChoiceChallengeResponse
                RefId="http://.../ref#choiceGroupA">
12.             <xx:ChoiceSelected RefId="http://.../ref#choice3" />
13.          </xx:ChoiceChallengeResponse>
14.          <xx:ContextData
                RefId="http://.../ref#cookie1"> ... </xx:ContextData>
15.        </xx:InteractiveChallengeResponse>
16.      </wst:RequestSecurityTokenResponse>
17.    </S11:Body>
18. </S11:Envelope>
```

Lines 1-18 represent the entire SOAP envelope. Lines 2-4 represent the SOAP header, and lines 5-17 represent the SOAP body. The body includes a RequestSecurityTokenResponse element (at lines 6-16), which is a framework element defined by WS-Trust. Lines 7-15 defines a unique InteractiveChallengeResponse element that includes the response to the interactive challenges of the InteractiveChallenge element. For instance, lines 8-10 represent that the mother's maiden name (correlated by RefId=1) is Goldilocks. Lines 11-13 represents that the age group choice selection is choice3 which corresponds to the age group 31 to 40.

The InteractiveChallengeResponse element may be generally described in one embodiment using the following schema description:

```
<InteractiveChallengeResponse ...>
   <TextChallengeResponse RefId="xs:anyURI">xs:string</
   TextChallengeResponse> *
   <ChoiceChallengeResponse RefId="xs:anyURI"> *
      <ChoiceSelected RefId="xs:anyURI" /> *
   </ChoiceChallengeResponse>
   <ContextData RefId="xs:anyURI"> xs:any </ContextData> *
   ...
</InteractiveChallengeResponse>
```

The following describes the attributes and elements listed in the schema outlined above. When an element is described as "required", that means that the element is used in this particular schema, and does not imply that the element is required of the invention. Similarly, an attribute is described as "required" if the attribute is to be present in the parent element if the parent element is present, and is not used to imply that the attribute is required of the invention. If fact, the principles of the present invention are not limited to hierarchically structured messages. The elements, attributes, and extension mechanisms of the example schema are defined as follows:

/InteractiveChallengeResponse element: A container element for the response to a challenge that requires interactive user input.

/InteractiveChallengeResponse/TextChallengeResponse element: This element value contains the user input as the response to the original text challenge issued.

/InteractiveChallengeResponse/TextChallengeResponse/@RefId attribute: A required attribute that specifies the identifier for the text challenge element in the original challenge which can be used for correlation.

/InteractiveChallengeResponse/ChoiceChallengeResponse element: A container element for the response to a choice challenge.

/InteractiveChallengeResponse/ChoiceChallengeResponse/@RefId attribute: A required attribute that specifies the reference identifier for the choice challenge element in the original challenge which can be used for correlation.

/InteractiveChallengeResponse/ChoiceChallengeResponse/ChoiceSelected element: A required element that specifies a choice item selected by the user from the choice challenge.

/InteractiveChallengeResponse/ChoiceChallengeResponse/ChoiceSelected/@Ref Id attribute: A required attribute that specifies the reference identifier for the choice item in the original choice challenge which can be used for correlation.

/InteractiveChallengeResponse/ContextData element: An optional element that carries a context data item from the original challenge that is simply reflected back.

/InteractiveChallengeResponse/ContextData/@RefId attribute: A required attribute that specifies the reference identifier for the context data element in the original challenge which can be used for correlation.

/InteractiveChallengeResponse/{any} element extension mechanism: This is an extensibility mechanism to allow additional elements to be specified.

/InteractiveChallengeResponse/@{any} attribute extension mechanism: This is an extensibility mechanism to allow additional attributes to be specified.

In order to prevent certain types of attacks, such as man-in-the-middle or replay of response, the challenge should be bound to the response. For example, a challenger message processor may use the <ContextData> element in the challenge to include a digest of any relevant replay protection data and verify that the same data is reflected back by the requester.

Referring back to FIGS. 2 and 3, the challenger message processor receives a challenge response from the challengee message processor (act 304). If the challenge response includes at least a derivative of the context token 271 provided in the challenge message, the context token may be used to derive state information necessary to validate the challenge response (decision block 305).

The challenger message processor then validates the challenge response at least in part based upon information provided in the challenge response (decision block 305). If the challenge response is not validated (No in decision block 305), then appropriate action may be taken (act 306). For instance, a "declined" message may be sent to the challengee message processor and/or the requesting message processor. Alternatively, perhaps a backup challenge or alternate challenge is sent to the challengee message processor, in which case processing may proceed along dotted line 321 in FIG. 3 so that a backup challenge may be issued. In that case, the process of selecting and issuing an appropriate challenge, and receiving and validating a corresponding challenge response may be performed iteratively for one or more additional challenge/response exchanges.

If the challenge response is validated (Yes in decision block 305), then appropriate action may be taken (act 307). For example, this might include granting the request, or perhaps running a second stage of challenges. If more challenge/response exchanges are to occur, processing may proceed along dotted line 322 in FIG. 3. In that case, the process of selecting and issuing an appropriate challenge, and receiving and validating a corresponding challenge response may be performed iteratively for one or more additional challenge/response exchanges.

The following represents an example of a SOAP message in which access to a security token is granted to the requester, and completes our SOAP example. Once again, line numbering is added so that specific lines can be referred back to in subsequent explanation of the example.

```
1.   <S11:Envelope ...>
2.     <S11:Header>
3.        ...
4.     </S11:Header>
5.     <S11:Body>
6.        <wst:RequestSecurityTokenResponseCollection>
7.           <wst:RequestSecurityTokenResponse>
8.              <wst:RequestedSecurityToken>
9.                 <xyz:CustomToken xmlns:xyz="...">
10.                    ...
11.                </xyz:CustomToken>
12.             </wst:RequestedSecurityToken>
13.             <wst:RequestedProofToken>
14.                ...
15.             </wst:RequestedProofToken>
16.          </wst:RequestSecurityTokenResponse>
17.       </wst:RequestSecurityTokenResponseCollection>
18.    </S11:Body>
19. </S11:Envelope>
```

Lines 1-19 represent the SOAP envelope. Lines 2-4 represent the SOAP header, and lines 5-18 represent the SOAP body. Lines 6-16 define a RequestSecurityTokenResponseCollection element, which is a framework element defined by WS-Trust. Lines 8-12 show a RequestedSecurityToken element defined by WS-Trust. Lines 9-11 show a custom CustomToken element not defined by WS-Trust. That element may contain the requested security token. Lines 13-15 show a RequestedProofToken defined by WS-Trust.

In one embodiment, it may take more than one stage of challenges before the challenger is willing to fully validate the request. Alternatively, or in addition, the challengee message processor may want to send its own challenges to the challenger message processor. Accordingly, the challenger and challengee message processors may continue communicating back and forth until all challenges on either side are responded to.

As one example, assume that the challenger message processor will require two stages of challenges, and that the challengee message processor may require three stages of challenges. The communication may appear as follows in sequential order:

1. A request for service is received by the challenger.
2. The challenger sends a challenge message including challenger stage 1 challenges to the challengee.
3. The challengee sends a challenge response message including responses to challenger stage 1 challenges, and including challengee stage 1 challenges.
4. The challenger sends a challenge response including responses to challengee stage 1 challenges, and including challenger stage 2 challenges.
5. The challengee sends a challenge response including responses to challenger stage 2 challenges, and including challengee stage 2 challenges.
6. Upon validation of the stage 2 challenges, the challenger grants the request service, and sends a challenge response including responses to challengee stage 2 challenges.
7. The challengee validates the stage 2 response, and sends stage 3 challenges.
8. The challenger sends a challenge response including responses to the stage 3 challenges.
9. The challengee validates the stage 3 challenges.
10. The challengee grants services requested by the challenger message processor.

If implemented in WS-Trust and the request is for a security token, the initial request may be implemented inside a RequestSecurityToken element defined by WS-Trust. In subsequent messages, if a challenge or a challenge response is included in the message, the message may be implemented within the framework of a RequestSecurityTokenResponse element defined by WS-Trust. In the final message granting or denying the request, the message may be implemented within the framework of a RequestSecurityTokenResponseCollection element defined by WS-Trust. Of course, that is just a specific example. Any challenges may be implemented within the "InteractiveChallenge" element described above, whereas any responses to challenges may be implemented within the "InteractiveChallengeResponse" element described above Accordingly, embodiments have been described in which a challenger message processor may choose from a variety of challenges when challenging a challengee message processor. This may be accomplished without affecting the underlying framework used for messaging. For instance, in one embodiment, this challenging is done by building custom XML elements to fit within the framework of existing WS-Trust elements. In that embodiment, since SOAP envelopes may be transmitted using many transport mechanism, the challenge mechanism is largely independent of the transport protocol used to communicate between message processors. Therefore, the challenge mechanism may be flexibly both in terms of the types of challenges supports, as well as the underlying transport mechanism of the message processors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method implemented within a distributed system including a challenger message processor that is communicatively coupled to one or more other message processors including a challengee message processor such that the challenger message processor and the one or more other message processors can communicate by transferring electronic messages, the distributed system comprising at least one processing unit and a memory having stored thereon computer-executable instructions which, when executed by the at least one processing unit, implement the method for the challenge message processor to challenge a challengee message processor, the method comprising:

an act of a challenge message processor receiving an electronic request from one of the one or more message processors, the challenge message processor implemented within a distributed system that includes least one processing unit;

in response to receiving the electronic request, an act of the challenge message processor identifying one or more types of interactive challenges from among a plurality of different types of interactive challenges, wherein each different type of interactive challenge requests a different form of information from a user;

an act of the challenge message processor generating a hierarchically structured challenge message that includes one or more challenge instances for each of the identified one or more types of interactive challenges, wherein each challenge instance is represented as a node in the challenge message, each node including: 1) a unique identifier for said challenge instance, 2) an identification of a type of interactive challenge for said challenge instance, and 3) challenge data from which said challenge instance may be presented to the user;

an act of the challenge message processor issuing the challenge message to a challengee message processor;

an act of the challenge message processor receiving, from the challengee message processor, a hierarchically structured challenge response that that includes information comprising a response to each of the one or more challenge instance of the challenge message; and an act of the challenge message processor validating the challenge response at least based in part upon the information provided in the challenge response.

2. The method in accordance with claim 1,
wherein the challenge message further includes a token that contains state information related to the challenge message such that the challenger message processor is relieved from having to use system resources to maintain state information related to the challenge message while waiting for the challenge response;
wherein the challenge response includes at least a derivative of the token sufficient that the state information may be derived by the challenge message processor; and
wherein the validating the challenge response comprises:
an act of obtaining the state information from the token; and
an act of using the state information to identify whether or not the challenge response is an acceptable response to the challenge.

3. The method in accordance with claim 1, wherein the message processor that issued the electronic request is the challengee message processor.

4. The method in accordance with claim 1, wherein the act of validating results in a determination that the challenge response is an acceptable response to the challenge message, the method further comprising:
in response to the successful validation, an act of providing a security token to challengee message processor.

5. The method in accordance with claim 1, wherein the act of validating results in a determination that the challenge response is an acceptable response to the challenge message, the method further comprising:
in response to the successful validation, an act of providing a security token to the message processor that issued the electronic request.

6. A method in accordance with claim 1, wherein the challenge message includes at least two challenge instances, and wherein each of the at least two challenge instances are represented by a different node in the challenge message.

7. A method in accordance with claim 6, wherein both the each node in the challenge message for the at least two challenge instances are descendent nodes of a parent interactive challenge node.

8. A method in accordance with claim 6, wherein the first and at least two challenge instances are of different types.

9. A method in accordance with claim 8, wherein at least one challenge instance is a text-based challenge type.

10. A method in accordance with claim 8, wherein the first at least one challenge instance is a choice-based challenge type.

11. The method in accordance with claim 8, wherein at least one challenge instance is a pin challenge type.

12. The method in accordance with claim 8, wherein the at least one challenge instance is an image to text challenge type.

13. The method in accordance with claim 8, wherein at least one challenge instance is a password challenge type.

14. The method in accordance with claim 1, wherein the one or more challenge instances are challenger-issued challenges, and wherein the challenge response includes not only responses to the challenger-issued challenge instances, but also includes a challengee-issued challenge.

15. The method in accordance with claim 1, wherein
in response to the challenge response, an act of the challenge message processor issuing a second challenge message to the challengee message processor;
an act of receiving a second challenge response from the challengee message processor, the second challenge response including responses to the second challenge message; and
an act of validating the challenge responses to the second challenge message at least based in part upon information provided in the second challenge response.

16. A method implemented within a distributed system including a challenger message processor that is communicatively coupled to one or more other message processors including a challengee message processor such that the challenger message processor and the one or more other message processors can communicate by transferring electronic messages, the distributed system comprising at least one processing unit and a memory having stored thereon computer-executable instructions which, when executed by the at least one processing unit, implement the method for the challengee message processor to respond to a challenge from the challenger message processor, the method comprising:
an act of receiving a hierarchically structured challenge message that includes one or more challenge instances from the challenger message processor, wherein each challenge instance is represented by a different node in the hierarchically structured challenge message, each node including information comprising: 1) a unique identifier for said challenge instance, 2) an identification of a type of interactive challenge for said challenge instance, and 3) challenge data from which said challenge instance may be presented to the user;
for each of the one or more challenge instances:
an act of identifying a challenge type of the challenge instance using the information provided in a corresponding node; and
based on the challenge type, an act of acquiring a type of user-issued information that matches the type of information called for by the challenge type; and
an act of generating a hierarchically structured challenge message that includes a challenge response that is generated using the user-issued information, wherein each challenge response is represented by a different node in the hierarchically structured response message.

17. The method in accordance with claim 16, wherein the challenge message and the challenge response message are each structured in conformity with WS-Trust.

18. One or more physical computer storage devices having thereon computer-executable instructions that, when executed by one or more processors of a computing system, cause the computing system to perform a method for a challenger message processor to challenge a challengee message processor, the method comprising:
an act of a challenge message processor receiving an electronic request from one of the one or more message processors, the challenge message processor implemented within a distributed system that includes least one processing unit;

in response to receiving the electronic request, an act of the challenge message processor identifying one or more types of interactive challenges from among a plurality of different types of interactive challenges, wherein each different type of interactive challenge requests a different form of information from a user;

an act of the challenge message processor generating a hierarchically structured challenge message that includes one or more challenge instances for each of the identified one or more types of interactive challenges, wherein each challenge instance is represented as a node in the challenge message, each node including: 1) a unique identifier for said challenge instance, 2) an identification of a type of interactive challenge for said challenge instance, and 3) challenge data from which said challenge instance may be presented to the user;

an act of the challenge message processor issuing the challenge message to a challengee message processor;

an act of the challenge message processor receiving, from the challengee message processor, a hierarchically structured challenge response that that includes information comprising a response to each of the one or more challenge instance of the challenge message; and an act of the challenge message processor validating the challenge response at least based in part upon the information provided in the challenge response.

19. The method in accordance with claim 1, wherein the electronic request comprises a hierarchically structured message that includes:

a first node that includes security authentication information, and a second node that includes a particular request of the challenge message processor.

20. The method in accordance with claim 1, wherein each challenge instance is represented as a node in the challenge response, each node including: 1) the unique identifier for the challenge instance, 2) the identification of the type of said interactive challenge, and 3) challenge response data provided by the user.

* * * * *

UNITED STATES PATENT AND TRADEMARK OFFICE
CERTIFICATE OF CORRECTION

| | |
|---|---|
| PATENT NO. | : 7,945,950 B2 |
| APPLICATION NO. | : 11/925734 |
| DATED | : May 17, 2011 |
| INVENTOR(S) | : Arun K. Nanda et al. |

It is certified that error appears in the above-identified patent and that said Letters Patent is hereby corrected as shown below:

In column 15, line 55, in Claim 7, after "wherein" delete "both the".

In column 15, line 59-60, in Claim 8, after "the" delete "first and".

In column 15, line 63, in Claim 10, after "wherein" delete "the first".

In column 16, line 1, in Claim 12, after "wherein" delete "the".

Signed and Sealed this
Twelfth Day of July, 2011

David J. Kappos
*Director of the United States Patent and Trademark Office*